(12) United States Patent  (10) Patent No.: US 8,607,643 B2
Wang et al.  (45) Date of Patent:  Dec. 17, 2013

(54) CORIOLIS MASS FLOWMETER

(75) Inventors: Tao Wang, Canterbury (GB); Yousif Hussain, Favell (GB)

(73) Assignee: Krohne AG, Basel (CH)

( * ) Notice: Subject to any disclaimer, the term of this patent is extended or adjusted under 35 U.S.C. 154(b) by 77 days.

(21) Appl. No.: 13/438,165

(22) Filed: Apr. 3, 2012

(65)  Prior Publication Data

US 2013/0042700 A1  Feb. 21, 2013

(30) Foreign Application Priority Data

Aug. 16, 2011 (DE) .......................... 10 2011 110 165
Sep. 30, 2011 (DE) .......................... 10 2011 114 569

(51) Int. Cl.
  *G01F 1/84*  (2006.01)
(52) U.S. Cl.
  USPC ..................................................... 73/861.355
(58) Field of Classification Search
  USPC ........................................... 73/861.354–356
  See application file for complete search history.

(56)  References Cited

U.S. PATENT DOCUMENTS

| | | | |
|---|---|---|---|
| 4,825,705 A | 5/1989 | Hohloch et al. |
| 5,271,281 A | 12/1993 | Mattar et al. |
| 5,423,221 A | 6/1995 | Kane et al. |
| 5,675,093 A | 10/1997 | Young et al. |
| 6,564,650 B2 | 5/2003 | Ollila et al. |
| 6,588,284 B1 | 7/2003 | Shiraishi et al. |
| 6,711,958 B2 | 3/2004 | Bitto et al. |
| 6,860,158 B2 | 3/2005 | Bitto et al. |
| 7,992,452 B2 | 8/2011 | Bitto et al. |
| 8,096,192 B2 | 1/2012 | Shimizu et al. |
| 2012/0167697 A1* | 7/2012 | Rieder et al. ............. 73/861.357 |
| 2012/0279317 A1* | 11/2012 | Bitto et al. ............... 73/861.355 |
| 2013/0042700 A1* | 2/2013 | Wang et al. .............. 73/861.355 |

FOREIGN PATENT DOCUMENTS

| | | |
|---|---|---|
| DE | 297 09 692 U1 | 7/1997 |
| EP | 0 239 679 A1 | 10/1987 |
| EP | 0 462 711 A1 | 12/1991 |
| EP | 1 130 367 A1 | 9/2001 |

* cited by examiner

*Primary Examiner* — Jewel V Thompson
(74) *Attorney, Agent, or Firm* — Roberts Mlotkowski Safran & Cole, P.C.; David S. Safran (57)  ABSTRACT

A Coriolis mass flowmeter with a measuring tube through which a medium can flow, at least one actuator and at least one sensor, wherein the measuring tube is bent between its input and output ends into a first winding and a second winding, the first winding and the second winding merging into one another at a transitional section of the measuring tube. The first winding and the second winding run in parallel winding planes and wherein the first winding and the second winding can be excited to oscillation by the actuator and the oscillations detected by the sensor. The Coriolis mass flowmeter is comparably insensitive to the coupling of external oscillations in that oscillating sections of the first winding and the second winding are bent into a V shape that opens in a direction toward the transitional section of the measuring tube.

17 Claims, 8 Drawing Sheets

CORIOLIS MASS FLOWMETER

BACKGROUND OF THE INVENTION

1. Field of the Invention

The invention relates to a Coriolis mass flowmeter with a measuring tube that can have a medium flowing through it, with at least one actuator and with at least one sensor, wherein the measuring tube is bent between its input end and its output end into a first winding and a second winding, the first winding and the second winding merging into one another at a transitional section of the measuring tube, the first winding and the second winding running in parallel winding planes and being opposite one another and wherein the first winding and the second winding can be excited to oscillation in oscillating sections by the actuator and the oscillations can be detected by the sensor.

2. Description of Related Art

Coriolis mass flowmeters have been known in a variety of very different designs for many years. In mass flowmeters that are based on the Coriolis principle, a measuring tube with medium flowing through it or measuring tubes with a medium flowing through them is/are excited to oscillation by an actuator, which preferably corresponds to an eigenfrequency of the measuring tube in the mounted position. On the input side and output side, inertial forces act differently on the flowing medium in the measuring tube excited to oscillation, and thus, on the measuring tube itself, so that the deflection of the measuring tube is influenced differently on the input and output sides. Usually, two sensors are provided for detecting oscillations, spaced from the actuator on the input and output sides so that, overall, the oscillations of the measuring tube detected by the sensors on the input and output sides have a phase shift that is a direct measure of the mass flow of interest. The measurement, namely the mass flow, is derived from the phase shift using evaluation electronics.

Such Coriolis mass flowmeters have the advantage that they only use one measuring tube, however, the measuring tube is bent into a first winding and a second winding that are opposite one another, i.e., run practically parallel to one another. The actuator acting between the first winding and the second winding deflects the oscillating sections of the first winding and the second winding in opposite directions—i.e., going away from or toward each other—so that the center of mass of the system is maintained overall and external oscillations, i.e., from connections, are practically not noticeable. This advantage is achieved by other Coriolis mass flowmeters that have more than one measuring tube and in which these measuring tubes are correspondingly deflected, however, in Coriolis mass flowmeters having more than one measuring tube, there has to be a transitional section (flow divider) on the input and output sides between a process connection and the multiple measuring tubes, which is omitted in the solution with one measuring tube wound into parallel loops.

When a Coriolis mass flowmeter is built into a piping system, external oscillations—should there be any—are inevitably transferred to the measuring device, which can negatively influence the measurement results because the measurement results are based directly on the oscillations detected by the sensors.

In particular, in small Coriolis mass flowmeters that are provided for the measurement of very small flow amounts, such a coupling of external oscillations is a problem.

SUMMARY OF THE INVENTION

A primary object of the present invention is, thus, to provide a suitable—in particular for the measurement of very small flow amounts—Coriolis mass flowmeter that is less sensitive to the coupling of external oscillations.

The above object is met with a Coriolis mass flowmeter of the type described here in that the oscillating sections of the first winding and the second winding are bent into a V shape and the open end of each V faces in the direction of the transitional section of the measuring tube. This means that the legs of the V-shaped, bent first winding and second winding extend away from one another in the direction of the transitional section, the point or section at which the legs come together, in which they run toward one another, is thus removed from the transitional area.

It has been observed in this particular design of the first winding and the second winding of the measuring tube that, at the same maximum dimensions of the oscillation sections of the windings, considerably greater smallest oscillation frequencies can be achieved than in other designs of the oscillating sections of the first winding and the second winding. In particular, greater smallest oscillation frequencies can be achieved than, for example, in circular or $\Omega$-shaped oscillating sections. A greater working frequency is thus advantageous because disturbance oscillations—normally of low frequency—from connected system parts do not directly affect the measurement results since they are not directly coupled with the measuring device.

Measuring tubes having an inner diameter of, for example, 1.2 mm and having a wall thickness of 0.2 mm are used in preferred designs of the Coriolis mass flowmeter according to the invention for very small flow amounts. The height of the oscillating sections of a measuring tube designed according to the invention having V-shaped, bent windings and having V legs opening in the direction of the transitional section of the measuring tube comes to about 60 mm, wherein the open ends of the V legs are then about 100 mm apart. In a measuring tube designed in this manner, the smallest eigenfrequencies of more than 100 Hz and even more than 150 Hz can be achieved.

In a particularly preferred design of the Coriolis mass flowmeter according to the invention, it is provided that the transitional section of the measuring tube is located in a base plane, in particular the transitional section with the input end and the output end of the measuring tube are located together in a base plane. This design has the advantage that, by all means, the sections of the first winding and the second winding that are not directly associated with the oscillating sections are not located scattered in space, and thus, in the Coriolis mass flowmeter. On the contrary, there is a certain basic structure and this is a factor in achieving a separability between the oscillating sections of the first winding and the second winding, which are directly associated with generating the wanted signal of interest, and the transitional section, and if necessary, the input end and the output end of the measuring tube, which are not directly associated with the structure generating the wanted signal.

The separation described above between the oscillating sections of the first winding and the second winding, on the one hand, and the transitional section, and if necessary, the input end and the output end of the measuring tube, on the other hand, is further improved in a preferred design in that the winding planes are perpendicular to the base plane so that a maximum distance of the mentioned sections is ensured.

Preferably, the legs of the V-shaped, bent oscillating section of the first winding section and/or the second winding section form identical angles with the base plane so that the V-shaped, bent oscillating section extends symmetrically over the transitional section of the measuring tube, wherein the legs run slowly toward one another with increasing distance from the transitional section, as opposed to Ω-shaped, bent measuring tube, in which the Ω legs would practically source in the center of the transitional section and would initially run away from one another with increasing distance from the transitional section and then finally come together again into a closed winding.

When it is said that the oscillating sections of the first winding and the second winding are bent in a V shape, then it is essentially meant that the legs of the measuring tube bent in a V shape in this section run together at one end and run apart at the other end. Of less importance is the radius of curvature at which the V-shaped section is closed at the closed end of the "V". Of course, the measuring tube does not end at the open end of the V leg of the measuring tube, however the oscillating section of the first winding or the second winding formed by the bent measuring tube ends there, for example, in that the oscillation of the measuring tube is limited in a defined manner or inhibited by a node plate.

The propagation of disturbance oscillations can be further reduced in a further preferred design in that the measuring tube is provided with a central mass in the transitional section between the first winding and the second winding and/or the measuring tube is permanently attached with a housing of the Coriolis mass flowmeter in the transitional section. In the ideal case, both measures are taken, i.e., the measuring tube in the transitional section is permanently attached to a central mass, wherein this central mass is additionally permanently attached to the housing of the Coriolis mass flowmeter. In this manner, it is effectively prevented that the oscillation of the first winding and the second winding are influenced in a manner that is not caused by the effects of Coriolis forces in each winding, i.e., which are not directly based upon the measuring principle. In this manner, overall greater precision can be brought about in measurements with the Coriolis mass flowmeter according to the invention.

In view of suppression of disturbance oscillations, in further advantageous designs of the invention, providing the measuring tube at the input section with an input section mass and/or providing the measuring tube at the output section with an output section mass is of particular importance. Alternatively, the measuring tube can be permanently attached at the input section to a housing of the Coriolis mass flowmeter and/or the measuring tube can be permanently attached at the output section to a housing of the Coriolis mass flowmeter, preferably, however, a mass is provided in the input section and/or in the output section that is additionally permanently attached to the housing of the Coriolis mass flowmeter. Due to this measure, it is possible to effectively intercept oscillations introduced via the connected external process pipe. It is also possible to combine the masses in the input section, in the output section and in the transitional section into one fundamental and de-coupling overall mass.

In detail, there are a plurality of possibilities for designing and further developing the Coriolis mass flowmeter according to the invention. Here, please refer to the following detailed description of preferred embodiments in conjunction with the accompanying drawings.

DETAILED DESCRIPTION OF THE INVENTION

Coriolis mass flowmeters 1 according to the invention are shown in FIGS. 1d-1f, 2d and 3d, which have a measuring tube 2 that can have medium flowing through it, wherein the design and path of the measuring tube 2 is of particular interest. For this reason, only the measuring tube 2 and relevant components are essentially shown in FIGS. 1a-1c, 2a-2c and 3a-3c. These components include an actuator 3 and two sensors 4a, 4b that serve to detect the oscillations of the measuring tube 2.

The illustrated Coriolis mass flowmeters 1 are wherein they only have a single measuring tube 2, which is bent between its input end 5 and its output end 6 into a first winding 7 and a second winding 8. Since only a single measuring tube 2 is present, the first winding 7 and the second winding 8 are connected to one another in a transitional section 9 of the measuring tube 2, or respectively, the first winding 7 and the second winding 8 merge into one another. The first winding 7 and the second winding 8 run in parallel winding planes, which is easily seen, in particular, in the views in FIGS. 1b, 2b and 3b.

Figure 1A:
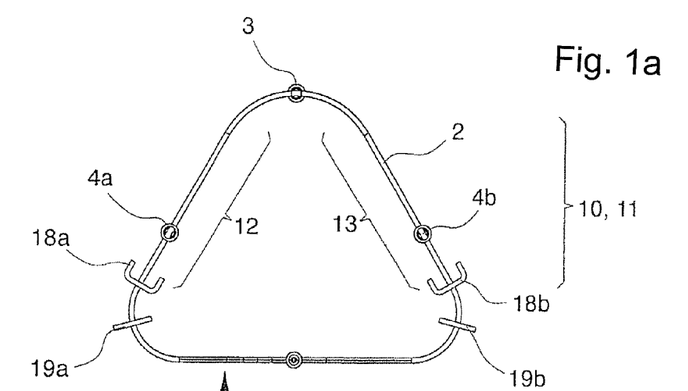
FIGS. 1a-1f show a first embodiment of a Coriolis mass flowmeter according to the invention having input ends and output ends running perpendicular to the windings with variations in the implementation of masses in the input section, output section and transitional section of the measuring tube.
Figure 2A:
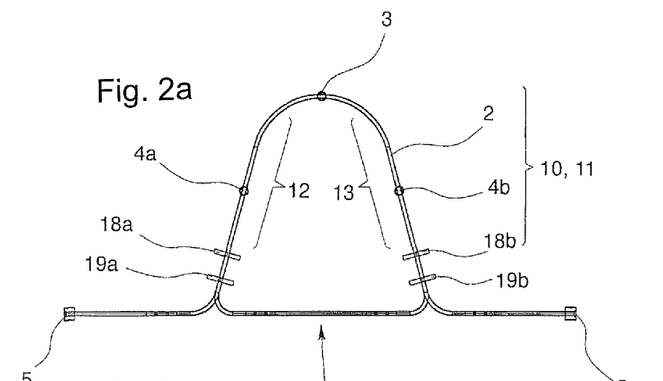
FIGS. 2a-2d show an embodiment similar to FIG. 1, but having an input end and output end of the measuring tube running essentially parallel to the winding planes
Figure 3A:
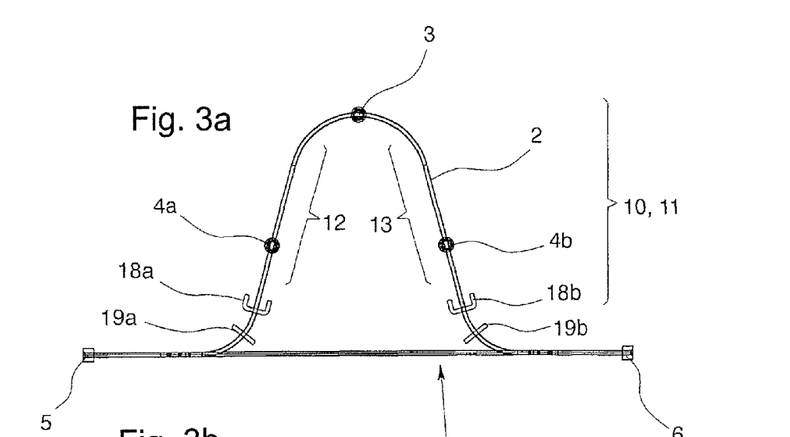
FIGS. 3a-3d show a further embodiment of a Coriolis mass flowmeter according to the invention with a design of the transitional section of the measuring tube differing from that of FIGS. 1 & 2.

The first winding 7 and the second winding 8 are opposite one another, i.e., neighbor one another at a short distance, in other words, in the line of sight, the first winding 7 and the second winding 8 are essentially congruent to one another perpendicular to the parallel winding planes, here please refer to the side view of FIGS. 1a, 2a and 3a.

Constructionally, it has been taken into consideration in the oscillating sections 10, 11 of the first winding 7 and the second winding 8 that the actuator 3 can excite the first winding 7 and the second winding 8 into well-formed oscillations for achieving a desired signal from the sensors 4a, 4b. In the other sections of the measuring tube 2, which are essentially adjacent to the input end 5 and the output end 6 of the measuring tube 2, such oscillations are not desired since they do not serve to achieve a desired signal required for measurement, rather they affect the measurement in a disturbing manner when they, for example, are transferred from the connected process pipe system and are coupled into the Coriolis mass flowmeter 1.

In all of FIGS. 1a to 3d, the particular form of the oscillating sections 10, 11 of the first winding 7 and the second winding 8 can also be seen, which results in that these oscillating sections 10, 11 are bent into a V shape, the open side of the V being directed toward the transitional section 9 of the measuring tube, which is of particular importance. The advantage of the V-shaped measuring tube that is bent into two oscillating sections 10, 11 is that greater smallest eigenfrequencies can be achieved with the windings 7, 8 designed in this manner than with measuring tubes 2 formed differently.

Examinations have shown that, for example, Ω-shaped or circularly shaped winding in the oscillating sections that, otherwise, have the same measuring tube characteristics have lower eigenfrequencies, which is disadvantageous in particular when unwanted coupling of external oscillations occurs. The same holds true for the opposite V-shaped oscillating sections, in which the oscillating sections 10, 11 of the first winding 7 and the second winding 8 are bent into a V shape and run toward one another in the direction of the transitional section 9 of the measuring tube 2, i.e., open at increasing distance from the transitional section 9 of the measuring tube 2 (similar to the Ω shape).

The illustrated embodiments also have in common that the transitional section 9 of the measuring tube 2 is located in a base plane, i.e., the measuring tube 2 in the transitional section 9 runs in a single plane and does not extend spatially in its path. Furthermore, the input end 5 and the output end 6 are also located in the same base plane in the illustrated variations. Due to this desired concentration of the sections of the measuring tube 2 not included the oscillating sections 10, 11 of the first winding 7 and the second winding 8, measures can be taken geometrically in one plane in order to inhibit disturbing oscillations in these parts of the measuring tube 2.

Such a geometric separation of desired oscillating sections 10, 11 and sections of the measuring tube 2 that do not oscillate or should not transfer oscillations is further improved in the illustrated embodiments in that the winding plane of the first winding 7 and the second winding 8 are practically perpendicular to the base plane, in which the sections of the measuring tube 2 are found and in which oscillation is not desired (see, in particular, the perspective view in FIG. 1*c*, 1*d* to 1*f*; FIG. 2*c*, FIG. 2*d*, FIG. 3*c* and FIG. 3*d*).

It is also common to the embodiments shown in the figures that both of the legs 12, 13 of the V-shaped, bent oscillating sections 10, 11 of the first winding 7 and the second winding 8 (which reference numbers, for simplicity's sake, are only present in FIGS. 1*a*, 2*a* and 3*a*) form identical angles to the base plane, wherein the angle formed between the leg 12, 13 and the base plane is always understood as the smallest angle to the base plane. All in all, it is achieved that the oscillating sections 10, 11 of the first winding 7 and the second winding 8 rise symmetrical over the base plane in the present case. The actuator 3 is connected to the section of the first winding 7 and the second winding 8, in which the leg 12, 13 of the V-shaped, bent oscillating sections 10, 11 run toward one another, i.e., at the peak of the V-shaped section.

Figure 1B:
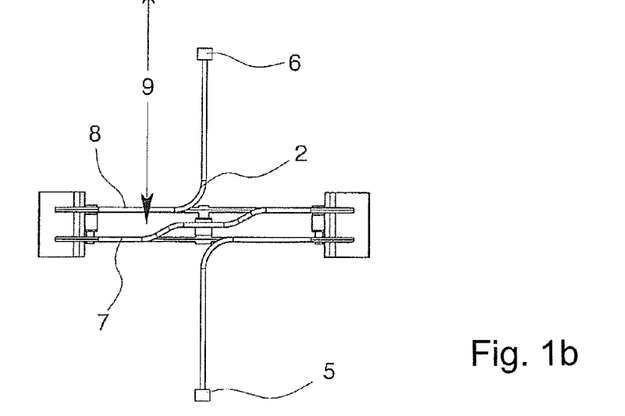
Figure 1C:
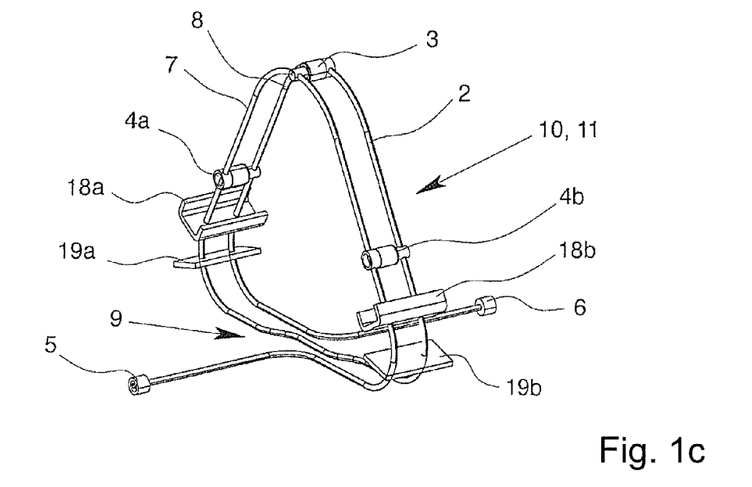
Figures 2B, 2C:
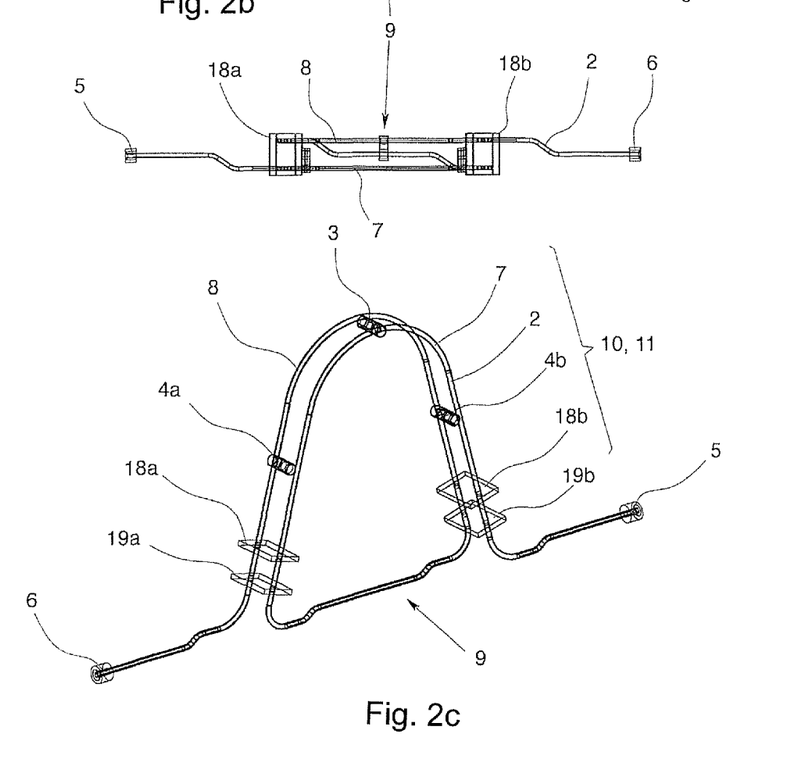
Figure 2D:
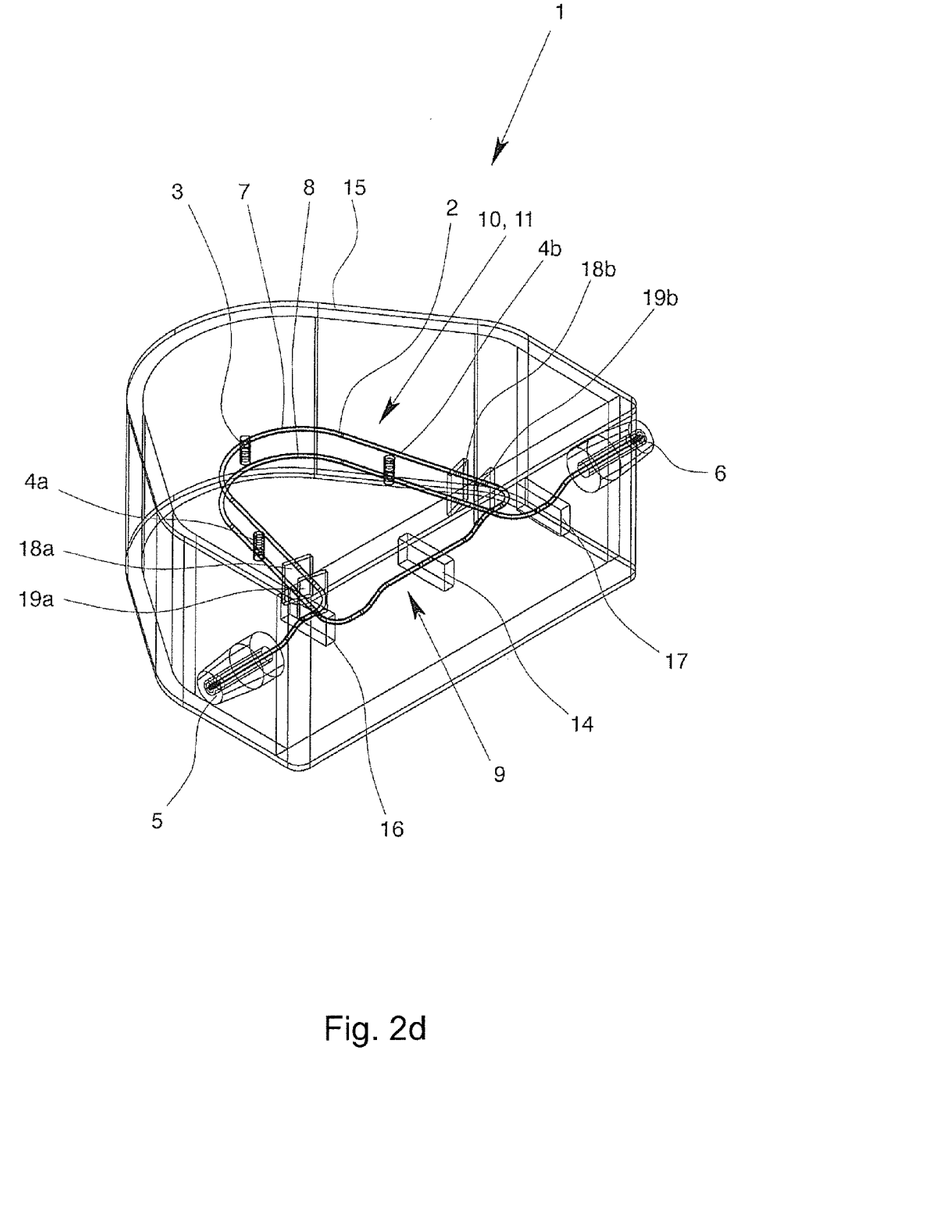
Figures 3B, 3C:
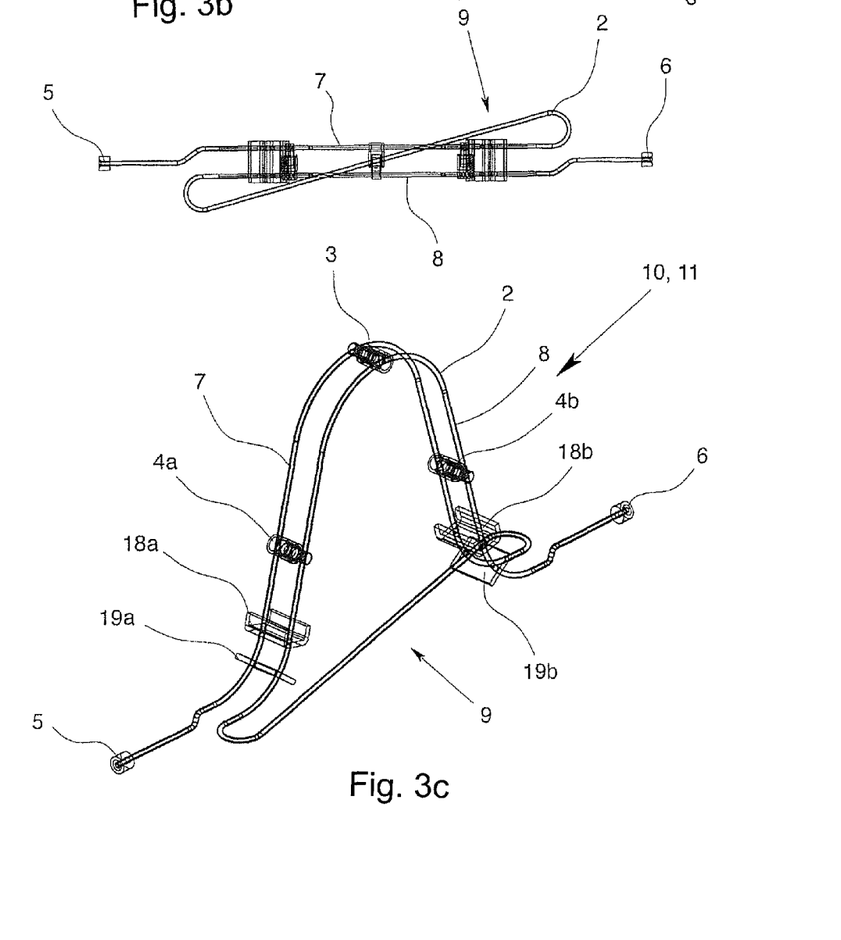

The embodiment shown in FIGS. 3*a*-3*d* differs from the other two embodiments in that the transitional section 9 of the measuring tube 2 is designed with an S shape, wherein the transitional section 9 is not confined to run between the winding planes, but instead crosses the winding planes and extends beyond the section bound between the winding planes (see, in particular FIG. 3*b* and compare with FIGS. 1*b* & 2*b*).

In the embodiments according to FIG. 1*e*, 1*f*, 2*d* and 3*d*, the transitional section 9 of the measuring tube 2 is provided with a central mass 14 that is also permanently attached to a housing 15 of the Coriolis mass flowmeter 1. The measure serves to inhibit oscillating interaction between the first winding 7 and the second winding 8 of the measuring tube 2, since only the effect of inertial force on both windings 7, 8 is of interest for the measurement of flow, further, other interactions between the windings 7, 8, however, are not desired.

In FIGS. 1*d*, 1*e*, 1*f*, 2*d* & 3*d*, it is also shown that the measuring tube 2 is provided with an input section mass 16 in the input section, which is also permanently attached to the housing 15 of the Coriolis mass flowmeter. In the same manner, the measuring tube 2 is provided in the output section with an output section mass 17, which is also permanently attached to the housing 15 of the Coriolis mass flowmeter 1. These masses also serve to inhibit undesired oscillations of the measuring tube 2, wherein the input section mass 16 and the output section mass 17 work against the coupling of external oscillations with oscillations in the Coriolis mass flowmeter 1.

Figure 1D:
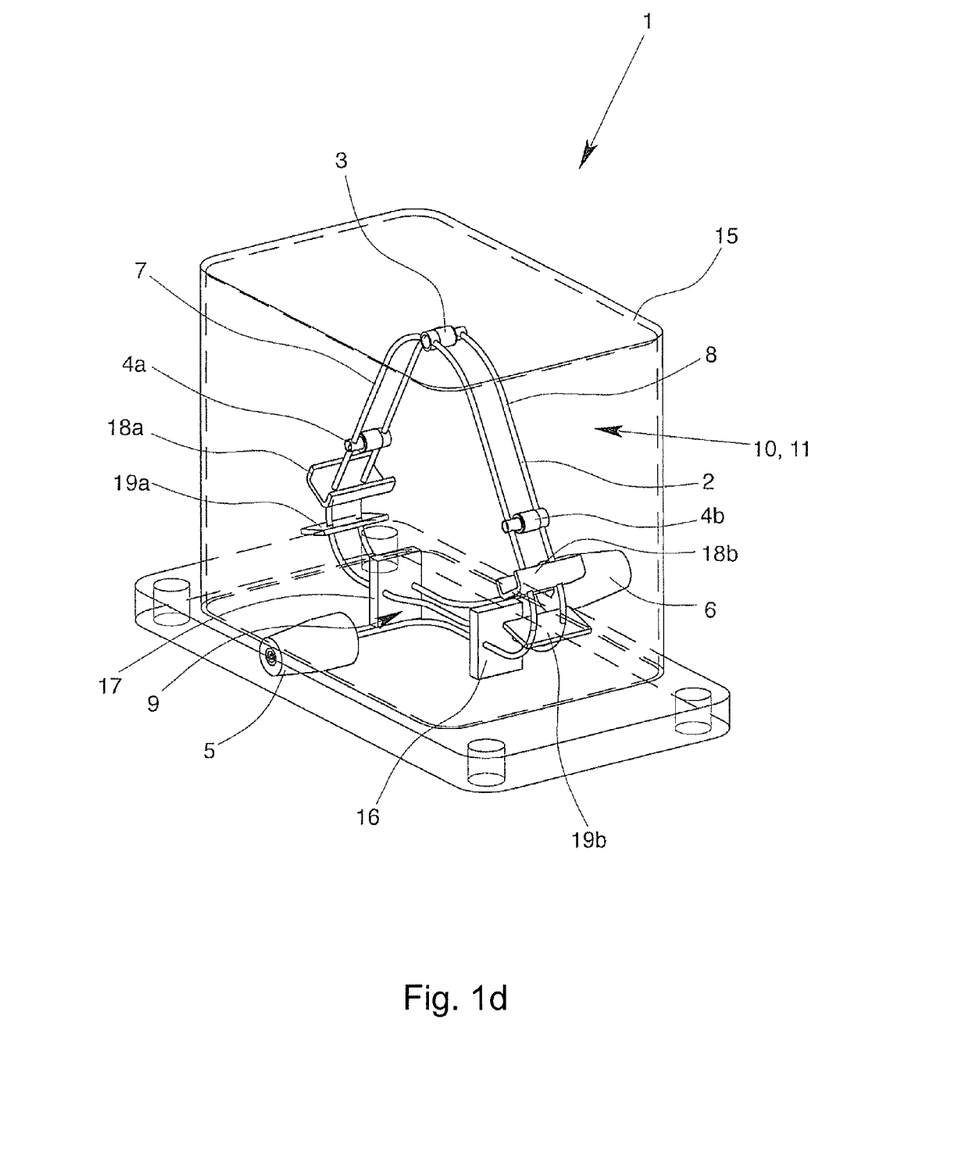
Figure 1E:
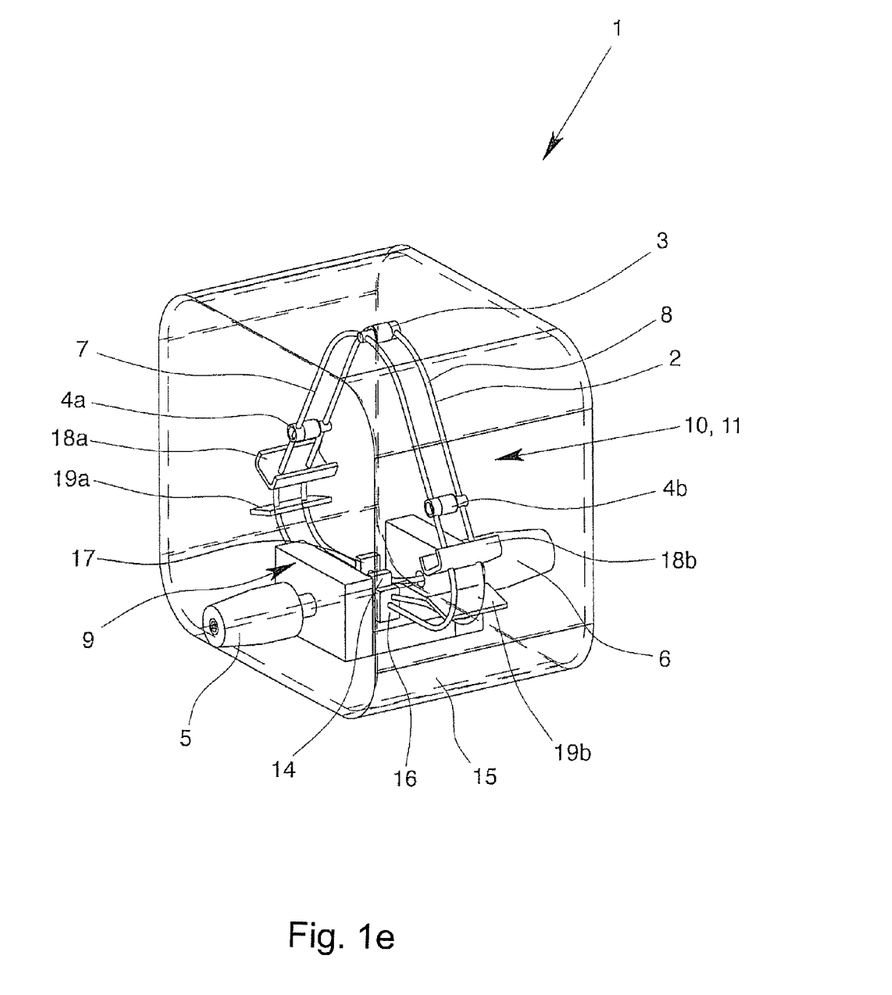
Figure 1F:
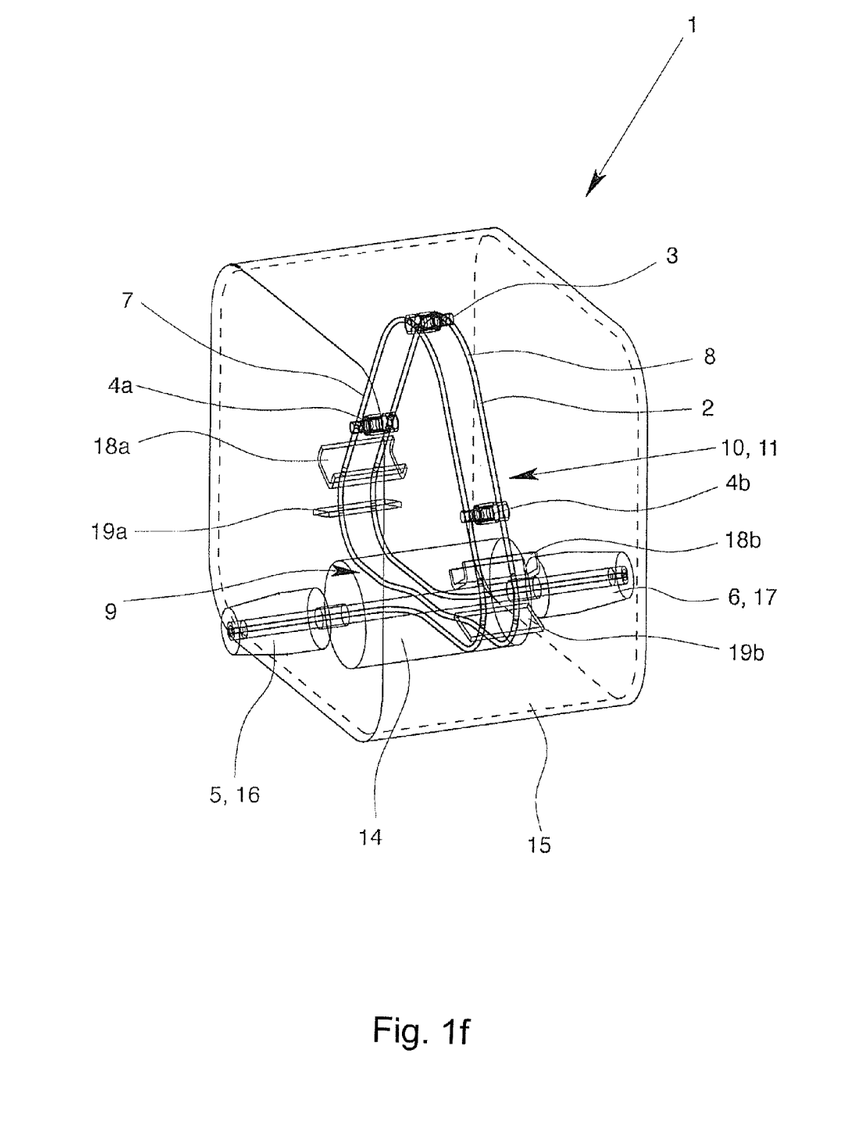
Figure 3D:
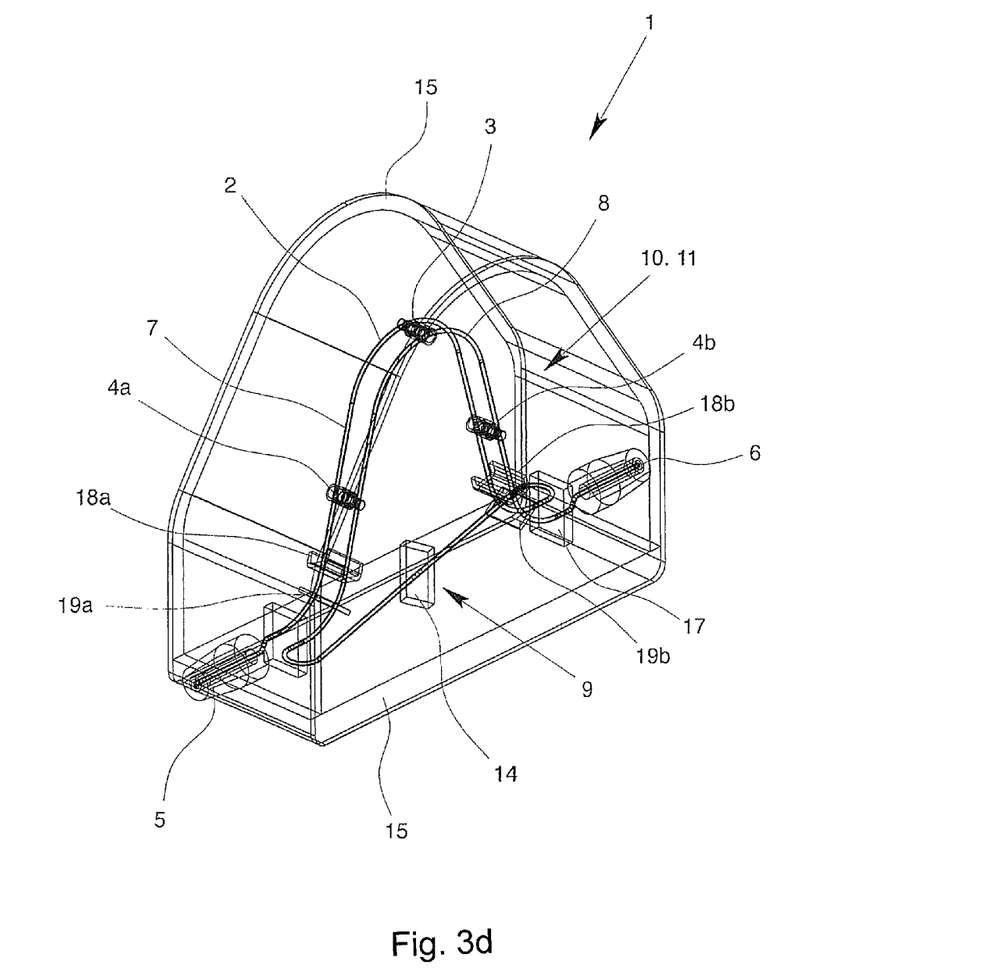

In the embodiments according to FIGS. 1*d* and 3*d*, a further measure is implemented for suppressing disturbance oscillations of the transitional section 9 of the measuring tube. A further suppression is achieved here in that an input end of the transitional section 9 of the measuring tube 2 is additionally attached to the input section mass 16—and via the input section mass 16 with the housing 15 of the Coriolis mass flowmeter—and an output end of the transitional section 9 of the measuring tube 2 is also attached to the output section mass 17—and thus, with the housing 15 of the Coriolis mass flowmeter 1.

In all of the embodiments, the oscillating section 10 of the first winding 7 and the oscillating section 11 of the second winding 8 is limited by two first node plates 18*a*, 18*b*, which are arranged on both spaced ends of the V legs 12, 13 of the measuring tube 2, wherein the first node plates 18*a*, 18*b* additionally connect the first winding 7 and the second winding 8 to one another. Due to the additional connection by the node plates 18*a*, 18*b*, the first winding 7 and the second winding 8 of the measuring tube 2 can no longer move in a manner opposed to one another, so that an oscillation of the measuring tube 2 relevant for measurement ends at the first node plates 18*a*, 18*b* or, respectively forms an oscillation node. These first node plates 18*a*, 18*b* are preferably bent in a U shape in order to have a defined stiffness against a bending moment which is introduced from the first winding 7 and the second winding 8 of the measuring tube 2 into the node plates 18*a*, 18*b*.

In order to further improve the suppression of oscillations via the first node plates 18*a*, 18*b*, two second node plates 19*a*, 19*b* are attached to the measuring tube 2 in the illustrated embodiments, a second node plate 19*a* being provided between the input end 5 of the measuring tube 2 and the first node plate 18*a* near the input end 5, and a further second node plate 19*b* between the output end 6 of the measuring tube and the first node plate 18*b* near the output end 6 of the measuring tube 2, wherein the second node plates 19*a*, 19*b* join the first winding 7 and the second winding 8 to one another.

The illustrated Coriolis mass flowmeters 1 are, without exception, intended for the detection of low flow. In the present cases, the first winding 7 and the second winding 8 have a maximum winding diameter of less than 10 cm, wherein the measuring tubes 2 having an inner diameter of 1.2 mm and a wall thickness of 0.2 mm.

What is claimed is:
1. Coriolis mass flowmeter, comprising:
   a measuring tube though which a medium is able to flow,
   at least one actuator and
   at least one sensor
   wherein the measuring tube has been bent between an input end and an output end into a into a first winding and a second winding, the first winding and the second winding having V shape and merging into one another at a transitional section of the measuring tube, the first winding and the second winding running in parallel winding planes with open sides of the V shape facing toward the transitional section of the measuring tube,
   wherein the actuator is able to excite oscillating sections of the first winding and the second winding into oscillation and
   wherein the sensor is able to detect oscillations of the winding sections.
2. Coriolis mass flowmeter according to claim 1, wherein the transitional section of the measuring tube is located in a base plane in which input and the output ends of the measuring tube are located.

3. Coriolis mass flowmeter according to claim 2, wherein the winding planes are perpendicular to the base plane.

4. Coriolis mass flowmeter according to claim 2, wherein legs of the V shape of at least one of the first winding and the second winding are disposed a the same angle relative to the base plane.

5. Coriolis mass flowmeter claim 1, wherein the actuator is joined to the apex of the V-shape of the windings.

6. Coriolis mass flowmeter claim 2, wherein the transitional section of the measuring tube has an S shape in said base plane.

7. Coriolis mass flowmeter claim 1, further comprising a housing in which the measuring tube is located and wherein the measuring tube is provided with a central mass in at least one of the transitional section and end sections of the measuring tube, the central mass being permanently attached to the housing.

8. Coriolis mass flowmeter claim 7, wherein the measuring tube is provided with an input section mass in the input section.

9. Coriolis mass flowmeter claim 1, further comprising a housing in which the measuring tube is located and wherein an input section of the measuring tube is permanently attached to the housing.

10. Coriolis mass flowmeter claim 7, wherein the measuring tube is provided with an output section mass in the output section.

11. Coriolis mass flowmeter claim 1, further comprising a housing in which the measuring tube is located and wherein an output section of the measuring tube is permanently attached to the housing.

12. Coriolis mass flowmeter according to claim 1, wherein an input end of the transitional section is attached to an input section mass.

13. Coriolis mass flowmeter according to claim 12, wherein an output end of the transitional section is attached to an output section mass.

14. Coriolis mass flowmeter claim 1, wherein the oscillating sections of the first and second windings are connected by a first node plate on each of spaced ends of the legs of the V shape.

15. Coriolis mass flowmeter according to claim 14, wherein a second node plate connects one of the legs of the V shape of the windings at a location between the input end of the measuring tube and the first node plate near the input end of the measuring tube, and wherein another second node plate connects the other of the legs of the V shape of the windings at a location between the output end of the measuring tube and the first node plate near the output end of the measuring tube.

16. Coriolis mass flowmeter claim 1, wherein the first winding and the second winding have a maximum winding diameter of less than 15 cm.

17. Coriolis mass flowmeter claim 1, wherein the measuring tube has a maximum inner diameter of 2 mm, and a maximum wall thickness of 0.3 mm.

* * * * *